(12) United States Patent
Jansson

(10) Patent No.: US 7,048,005 B2
(45) Date of Patent: May 23, 2006

(54) THROTTLE VALVE DEVICE FOR A PNEUMATIC POWER TOOL

(75) Inventor: Anders Urban Jansson, Älvsjö (SE)

(73) Assignee: Atlas Copco Tools AB, Nacka (SE)

( * ) Notice: Subject to any disclaimer, the term of this patent is extended or adjusted under 35 U.S.C. 154(b) by 98 days.

(21) Appl. No.: 10/880,932

(22) Filed: Jun. 30, 2004

(65) Prior Publication Data

US 2005/0006615 A1 Jan. 13, 2005

(30) Foreign Application Priority Data

Jul. 7, 2003 (SE) .................................... 0301985

(51) Int. Cl.
*F16K 31/44* (2006.01)
*B23B 45/04* (2006.01)

(52) U.S. Cl. .................. 137/629; 137/599.01; 173/169

(58) Field of Classification Search ........... 137/599.01, 137/599.11, 629; 173/169; 251/213
See application file for complete search history.

(56) References Cited

U.S. PATENT DOCUMENTS

| 679,687 | A |   | 7/1901 | Simpson |
|---|---|---|---|---|
| 2,899,935 | A | * | 8/1959 | Dalton ............................ 91/6 |
| 3,326,240 | A | * | 6/1967 | McConnaughay ....... 137/637.4 |
| 4,476,942 | A | * | 10/1984 | Elkin ........................ 173/169 |
| 5,626,198 | A |   | 5/1997 | Peterson |
| 5,797,462 | A |   | 8/1998 | Rahm |
| 5,901,794 | A |   | 5/1999 | Schoeps et al. |
| 6,085,849 | A |   | 7/2000 | Scigliuto |
| 6,164,387 | A | * | 12/2000 | Chang ........................ 173/169 |

FOREIGN PATENT DOCUMENTS

| DE | 12 39 534 B |   | 4/1967 |
|---|---|---|---|
| FR | 2 571 094 A |   | 4/1986 |
| GB | L01624 A |   | 0/1911 |
| GB | 2198215 A | * | 6/1988 |

* cited by examiner

*Primary Examiner*—Ramesh Krishnamurthy
(74) *Attorney, Agent, or Firm*—Frishauf, Holtz, Goodman & Chick, P.C.

(57) ABSTRACT

A throttle valve device for a pneumatic power tool comprises a casing (10) with an air inlet passage (11), an air outlet passage (12), a valve chamber (13) with a main valve seat (14) and a main valve element (15), and a manually shiftable activating rod (21) which is sealingly guided in a lateral guide way (19) and arranged to engage and displace the main valve element (15) off the main seat (14), wherein the activating rod (21) has a valve portion (27,28) for co-operation with a secondary valve seat (24) in the guide way (19) for controlling a bypass passage (23,24,29) extending between the inlet passage (11) and the outlet passage (12) such that the activation rod valve portion (27,28) is separated from the secondary valve seat (24) and opens up the bypass passage (23,24,29) before the activation rod (21) engages and displaces the main valve element (15) off the main seat (14) when operating the activation rod (21) in the opening direction.

2 Claims, 1 Drawing Sheet

THROTTLE VALVE DEVICE FOR A PNEUMATIC POWER TOOL

BACKGROUND OF THE INVENTION

The invention relates to a throttle valve device in which a main flow passage is controlled by a main valve element in co-operation with a main valve seat, and a manually operable activation rod sealingly guided in a guide way and shiftable between an inactive position and an active position in which it contacts and displaces the main valve element off the main valve seat, thereby opening up the main flow passage.

Throttle valves of the seat type are advantageous in that they are easy to get fully tight when closed. They are also relatively compact and simple in design, which are preferable features in power tool applications. However, throttle valves of this type are typically suffering from two problems, namely: a) poor smooth start properties and, b) a relatively high opening force. Both of these problems make it difficult to start the tool smoothly, which in for instance drilling and screw tightening operations is a necessary feature to perform safe and accurate working operations.

The relatively high opening force of the valve is due to the fact that the full flow area valve has to be opened against the full air line pressure with no counter pressure from the power tool motor. One way of reducing the required opening force is to use a tilting type valve element, as described in U.S. Pat. No. 5,901,794, where the maneuver force is reduced by the lever effect of a stalk-like arm on the valve element. This type of valve, however, is not very compact in design and is suitable for pistol type power tools.

Another way of reducing the opening force of a throttle valve is to use a slide valve as described in U.S. Pat. No. 5,626,198. However, this type of valve is more expensive in manufacturing and difficult to get fully tight when in closed position. In this type of valve it is also difficult to obtain a low pressure drop and/or a large flow capacity without increasing the overall size of the valve undesirably.

The poor smooth opening properties of the seat type valve depends not only on the fact that the full area valve is opened in one step. It is also due to the fact that when starting the valve opening process a rather sudden pressure drop across the valve is accomplished which results in an abrupt reduction in the required valve opening force and an inevitably increased valve opening speed. This causes a rather quick full flow area opening.

A previous solution to this problem is described in U.S. Pat. No. 5,797,462. The described throttle valve arrangement comprises a two-step seat valve wherein the main valve element as well as a smaller auxiliary valve element are carried on a maneuver spindle, and the auxiliary valve element is arranged to control an opening in the main valve element. This type of throttle valve, however, is particularly suitable for pistol type power tools and requires a rather complicated inlet passage.

OBJECTS OF THE INVENTION

The main object of the invention is to provide a throttle valve device for a pneumatic power tool, wherein a smooth start feature is accomplished by arranging an operation rod controlled by-pass passage between the inlet and outlet passages of the valve for accomplishing a reduced initial air inlet flow with a subsequent reduction of the pressure drop across the main valve element and a subsequent reduced valve opening force.

Another object of the invention is to provide a structurally simple throttle valve device having a main valve element in the form of a ball, wherein the activating rod is arranged to contact and urge the ball sidewise off the main valve seat.

Further objects and advantages of the invention appear from the following specification and claims.

A preferred embodiment of the invention is described below in detail with references to the accompanying drawing.

DETAILED DESCRIPTION

Figure 1:
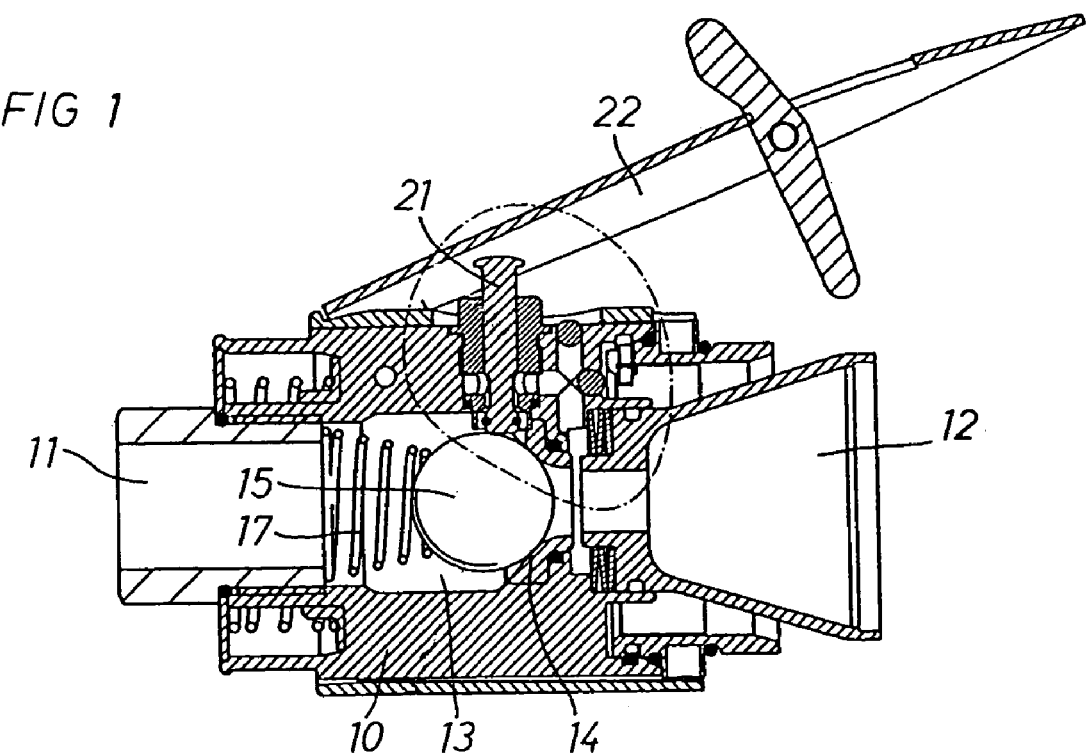
FIG. 1 shows a longitudinal section through a throttle valve device according to the invention.
Figure 2:
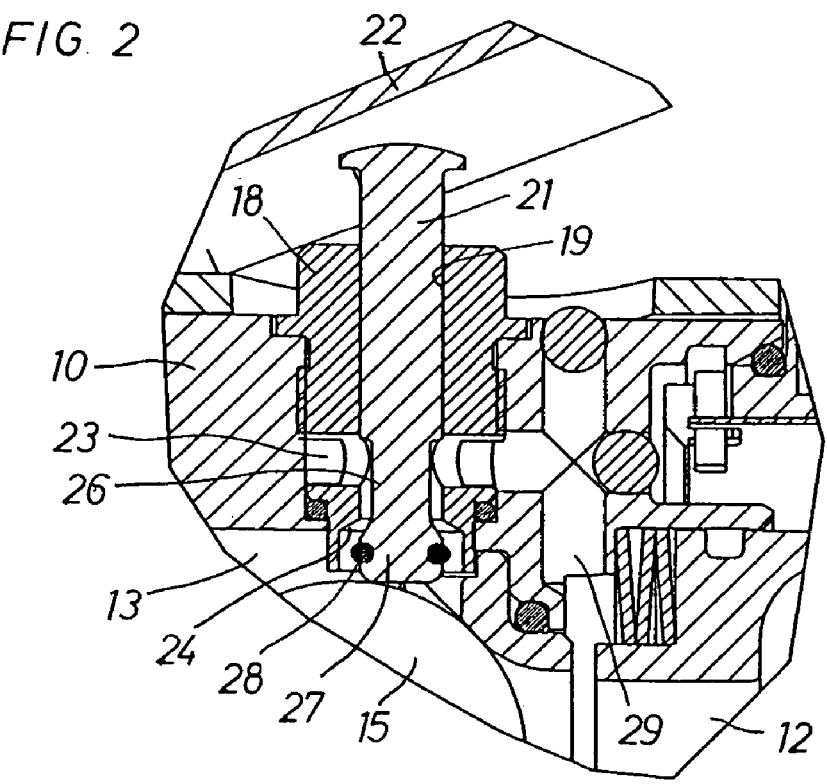
FIG. 2 shows, on a larger scale, a portion of the valve device in FIG. 1.

The throttle valve shown in the drawing figures comprises a casing 10 which is intended to be attached to the housing of a power tool (not shown). The casing 10 has an air inlet passage 11 communicating with a pressure air source, an air outlet passage 12 communicating with the motor of the power tool. A valve chamber 13. continuously communicating with the inlet passage 11 and containing an annular main valve seat 14 for co-operation with a ball shaped valve element 15. A spring 17 exerts a bias force on the ball valve 15, which together with the air pressure in the inlet passage 11 maintains the ball valve 15 seated on the valve seat 14 in a closed position. The ball valve 15 forms the main valve element of the throttle valve and controls a substantially straight main flow passage extending through the casing 10 via the main valve seat 14.

In the casing 10, perpendicularly to the main flow passage, there is mounted a sleeve element 18 with a guide way 19. A maneuver rod 21 is sealingly guided in the guide way 19 and is shiftable by means of an external operating lever 22 between an inactive position and an active position. In the latter position the activating rod 21 co-operates with and displaces the ball valve 15 sidewise off the valve seat 14, thereby opening the main flow passage. The lever 22 is pivotally supported on the outside of the casing 10 for manual operation.

The sleeve element 18 has a lateral opening 23 and an annular shoulder 24, and the activating rod 21 is formed with a waist portion 26 and a valve portion 27. The valve portion 27 carries an O-ring seal 28 and is arranged to co-operate sealingly with the shoulder 24 as the activating rod 21 occupies its inactive position. The lateral opening 23 communicates with the outlet passage 12 via a passage 29 in the casing 10 such that when the activating rod 21 occupies its active position there is established a small area bypass passage extending past the main valve seat 14 and connecting the inlet passage 11 directly to the outlet passage 12. The valve portion 27 is maintained in sealing engagement with the shoulder 24 by the air pressure in the inlet passage 11. In the drawing figures the throttle valve is not pressurized at all which means that there is no closing force acting on the activating rod 21 and the valve portion 27, and the activating rod 21 occupies a position between the inactive position and the active position.

In operation, the throttle valve is attached to a power tool housing by its outlet passage end and connected to a pressure air source by its inlet passage end. The air pressure in the valve chamber 13 together with the spring 17 presses the ball valve 15 against the seat 14 to maintain the valve in closed position. The pressure air also acts on the activating rod 21 and pushes the latter outwardly such that the valve portion 27 engages the shoulder 24 in the sleeve 18. In this position, both valves are closed and no motive air is supplied to the power tool.

As the lever 22 is pressed down the activating rod 21 is shifted inwardly such that, in a first sequence the valve portion 27 separates from the shoulder 24 and opens up the small area bypass passage 23,29. This means that a limited pressure air supply flow is established which initiates a smooth and relatively slow start of the tool. It also means that there is a certain reduction in the pressure difference across the main valve seat 14, and hence a reduced closing force on the main ball valve element 15 is accomplished. This means in turn that the required opening force on the ball valve 15 is reduced, and a slow opening of the main valve 15 is facilitated.

As illustrated in the figures, the bypass passage 23,29 is opened well before the activating rod 21 engages and starts displacing the ball valve element 15 off the valve seat 14. This is to ensure that a reduction in the pressure drop across the main valve seat 14 really takes place before the displacement of the main valve element 15 is commenced, and that a really smooth start of the power tool is obtained.

The invention claimed is:

1. A pneumatic power tool comprising a housing, a motor and a smooth-start throttle valve for controlling a pressure of an air supply to the motor, wherein the throttle valve comprises:

a casing with an inlet passage;

an outlet passage;

an annular main valve seat separating the inlet and outlet passages;

a ball valve element co-operating with said main valve seat in a closed throttle valve condition;

a manually operable activating rod supported in a transverse guide way in the casing, said activating rod being arranged to displace the ball valve element out of sealing engagement with said main valve seat in an open throttle valve condition;

a bypass passage extending past the main valve seat, said by-pass passage being formed by a waist portion on the activating rod; and a secondary valve element carried by the activating rod and arranged to co-operate with a secondary valve seat located on and at the and of the guide way;

wherein the secondary valve element is arranged to open the bypass passage by being displaced from said secondary valve seat before the activating rod contacts and displaces the ball valve element from the main valve seat upon displacement of the activating rod.

2. The power tool according to claim 1, wherein the secondary valve element comprises an O-ring supported in a circumferential groove in the activating rod.

* * * * *